United States Patent Office 2,841,513
Patented July 1, 1958

2,841,513

PLASTIC FLUX

William G. Morrison, Jr., Niagara Falls, N. Y., assignor to Union Carbide Corporation, a corporation of New York No Drawing. Application July 7, 1954
Serial No. 441,922

8 Claims. (Cl. 148—23)

This invention relates to arc welding fluxes, and more particularly to a plastic welding flux for use in electric arc welding utilizing a continuously fed electrode.

Conventional protective fluxes find use in electric welding in both the so-called shielded arc welding process, and the submerged melt welding process. The first of these processes may be used for "all position welding" on both the top and bottom sides of horizontal surfaces, and on vertical or sloping surfaces of metals having wide composition ranges and tensile strength. Its application is principally manual and not continuous, as the flux is supplied as a coating on relatively short lengths of core wire. By contrast, the submerged melt welding process is automatic, or at least semi-automatic, since it employs a bare electrode of great length to which a flux is supplied as a comminuted composition distributed along the welding path immediately before the passage of the electrode. Faster welding speeds than are possible with the shielded arc process are attained in this process owing to the permissible use of much higher currents, and to the continuous character of the operations. The submerged melt process thus offers considerable economic advantage. Its major disadvantage is that it cannot be used for "all position welding," being applicable principally for so-called "position welding" on the top of substantially horizontal surfaces. Another disadvantageous characteristic of the submerged melt process lies in the fact that its semi-automatic procedures are limited in application because the operator cannot see the end of the electrode, and thus may fail to guide it accurately along the seam.

Many attempts have been made to combine the advantages possessed by both processes, and in this connection several approaches have been suggested. One of these involves the application of prebaked arcuate continuous sections or continuous strips of flux to the welding electrode after it issues from the contact jaw, or wrapping around the electrode a somewhat flexible flux-impregnated metallic or cloth tape. Another approach has been to use devices which attempt to combine an extrusion die with a rod feeding device, so that a coating of flux is built up around the electrode after the rod wire has passed the current contact. A third attempt to achieve the desired combination involves feeding into the arc zone a flux-impregnated tape or ribbon of plastic flux, this material being applied immediately ahead of the electrode.

These methods have all been unable to combine the desirable features of the two main welding processes above mentioned, because they were based upon the use of flux compositions conventionally employed to make coated electrodes. Many such compositions normally contain a gas-forming solid constituent of a cellulosic nature, capable of providing a protective atmosphere around the weld, an arc stabilizer such as rutile, a deoxidizing alloy such as ferromanganese and a binder, usually a silicate or aluminate; the inorganic compounds combining to form slag. Where by contrast with these compositions a so-called plasticized flux has been employed in connection with these processes in the past, its plasticity has resulted from the addition of water or of a water solution of the binder.

Such flux coating provides a dual form of protection for the molten metal during its transfer from the welding electrode to the work and prior to freezing as weld metal. The cellulosic material by its thermal decomposition and/or oxidation provides a shielding atmosphere during welding. There may occur, however, under some operating conditions, a low temperature decomposition, whereby instead of forming the desired protective carbon oxides, the cellulosic material decomposes into water and carbon. It has been found that the failure of the prior methods discussed results from the failure of the water emanating from this source as well as that originally introduced with, or present in, the silicate, to volatilize rapidly enough to prevent the introduction of some water vapor in the welding zone with a resultant severe porosity in the weld and strength impairment.

It is, therefore, the primary object of this invention to provide a plastic welding flux suitable for all position welding, economical in operation and cost, and which will produce porosity-free high-quality weld deposits.

It is another of its objects to provide a plasticized flux having characteristics similar to those fluxes found upon commercially available coated electrodes, but modified so that it may be applied to the welding zone in any manner, that is as a coating around the electrode applied as the latter is fed continuously toward the welding zone, or as a ribbon applied along the welding seam at any time prior to the passage of the electrode either mechanically or manually.

It is still a further object to provide a flux composition permitting welding to be done at currents at least four or five times greater than may be employed with any prior art precoated electrode of the same wire diameter.

These objects, as well as the combination of the advantages of the prior art processes above discussed without their individual limitations, obtain essentially by the substitution of novel plasticizing agents having critical physical and chemical properties in place of conventional water-containing or producing elements present in welding fluxes.

The fluxes of the invention may contain the conventional arc stabilizing materials, fluxing agents, and deoxidizing alloys, all of which may vary greatly in composition, but are characterized by the inclusion of improved plasticizing agents. Suitable plasticizing agents for use in this invention comprise organic liquids or semi-solids, used singly or in combination, having carbon-to-oxygen ratio, physical and chemical properties such as viscosity, boiling point, toxicity, compatibility with other flux components and high temperature thermal decomposition characteristics within certain prescribed limits.

While the present invention is based upon the concept of replacing solid gas-forming constituents in flux coatings with liquid or semi-solid organic compounds having similar ratios of carbon to oxygen, plasticizers satisfactory for use in this invention must meet other requirements. If the flux is to retain its plasticity over the range of temperatures normally encountered where welding is performed, the oxygen-bearing organic plasticizing material should have a viscosity of not more than 5000 centipoises at 20° F., and a minimum of 10 centipoises at temperatures up to 120° F. Preferably the carbon-to-oxygen ratio of the plasticizer should be within the limits of 0.5 to 1, to 2 to 1. Conducive to a better understanding of the invention, it is well to note that the carbon to oxygen ratio of a molecule of glycerol ($C_3H_8O_3$) may be expressed, for example, as follows on the basis of its atomic structure.

$$\frac{C}{O} = \frac{3 \text{ atoms per molecule}}{3 \text{ atoms per molecule}} = 1$$

Polyethylene glycol has the empirical ratio $$\frac{C_{2n}}{O_{n+1}}$$

where $n$ = the number of combined monomers. Polyethylene glycol has a molecular weight of about 200, corresponding to the tetramer, or $n=4$. This may be illustrated with respect to the above ratio as follows:

$$\frac{C}{O} = \frac{2n}{n+1} = \frac{2(4)}{4+1} = \frac{8}{5} = 1.6$$

Oxalic acid $(COOH)_2$ may be expressed as $$\frac{C}{O} = \frac{2}{4} = 0.5$$

It is also necessary that the compounds here selected possess a boiling point greater than 450° F. to prevent volatilization or an excessive decrease in flux viscosity, owing to the heat of the electrode extension prior to its arrival in the arc zone. The material must also have the ability to wet the solid flux components, and must be chemically inert with respect to those components during storage, but may react upon initial mixing with the other flux components, provided stable products are formed.

The plasticizer must not decompose into products that are toxic under normal welding conditions. It must be substantially decomposible into hydrogen and oxides of carbon at arc temperatures. Further, the decomposition of the plasticizer must not be self-propagating.

Employing oxygenated plasticizers whose carbon-to-oxygen ratios lie within the limits specified is of importance in obtaining the best posible physical properties of weld metal. Below the lower limits indicated there may be an excess of oxygen, depending upon the amount of hydrogen present in the organic compound, and upon the oxygen available from the other flux constituents, in which case carbon may be removed from the weld metal with a consequent decrease in tensile strength. Where the carbon-to-oxygen ratio exceeds the limits indicated, an excess of carbon may dissolve in the weld metal, and in particular instances cause such metal to become brittle. This effect may be used advantageously when welding carbon-containing metals such as steel, to control the physical properties of the weld metal by varying the carbon-to-oxygen ratio within the limits hereinabove indicated.

Among the oxygenated organic compounds both aromatic and aliphatic which meet the above requirements, are aldehydes, ketones, ethers, carbonates, esters, alcohols and acids, used singly or in various combinations. Obviously not all the compounds of the classes indicated will meet the desired requirements, particularly with respect to freezing point, viscosity and carbon-to-oxygen ratio. A few compounds whose properties lie within the ranges delineated are some of the dihydric and trihydric alcohols. Dihydric alcohols found particularly suitable in the practice of this invention are ethylene glycol and polyethylene glycol. One characteristic material of the trihydric alcohol class well suited as a plasticizer for the flux of the invention is glycerol.

The plasticity of the flux is mainly a function of three factors—the viscosity of the organic liquids or semi-solids used as the plasticizer, the particle size of the dry components and the ratio of plasticizer to solids. For best results it was found that the viscosity of the plasticizer should be adjusted to the sizing of the flux components. In general, dry components having a large particle size are preferably mixed with a plasticizer with viscosity in the upper part of the range given above. The dry flux components used have had a particle size less than 100 mesh (0.147 mm.).

One typical flux prepared to this invention has used the following mixture of dry components:

| | Parts |
|---|---|
| Asbestos (olivine) | 16 |
| Titanium dioxide | 12 |
| Ferromanganese | 8 |
| Sodium silicate | 34 |

Another suitable flux had the following composition:

36 parts by weight $CaCO_3$ (limestone)
34 parts by weight $CaF_2$ (fluorospar)
9 parts sodium silicate
3 parts $Al_2O_3$
7 parts $SiO_2$
1 part ferromanganese
5 parts ferrotitanium
5 parts ferrosilicon These dry mixtures have been used in varying particle sizes as indicated above, in the following proportions up to 80% of the total plastic flux with the following plasticizing agents:

70 parts by weight—30 parts glycerol (95%)
70 parts by weight—30 parts polyethylene glycol
70 parts by weight—5 parts polyethylene glycol+25% glycerol In one embodiment of this invention, the following flux composition, having the particle size designated within parentheses, was used:

16 parts magnesium silicate (0.043 mm. screen opening)
12 parts titanium dioxide (0.043 mm. screen opening)
8 parts ferromanganese (0.043 mm. screen opening)
34 parts sodium silicate (0.043 mm. screen opening)
30 parts glycerol (95% U. S. P.)

This flux was applied to base plates by a mechanism similar to a caulking gun or manually with a spatula. Using the flux above described, welds were made in a ⅜ inch plate in which a 90° V had been cut to a depth of ¼ inch. Welds were made using ³⁄₃₂ inch diameter welding rods fed at an average rate of 75 to 80 inches per minute. The welds produced were virtually or completely free of weld porosity as determined by radiographic examination.

Welds were obtained using approximately 300 amperes at 31 volts, direct current-reverse polarity with a welding speed of 10 to 12 inches per minute. Still higher currents up to 450 amperes have been employed. In comparison to the above conditions, it should be noted that commercially available shielded arc coated electrodes with flux coatings of similar composition and ³⁄₃₂ inch core wire are rarely used at currents in excess of 75 amperes, the more common range being from 60 to 70 amperes. Thus the permissible currents which may be used with the flux of this invention and the same diameter rod are at least four times those that may be used with the precoated shielded arc electrodes. Further, this compares favorably with the 140 to 400 amperes used with ³⁄₃₂ inch rods with the inert gas shielded arc welding process and the 250 to 400 amperes used for this diameter rod with the submerged melt process.

The plastic flux of the invention may be extruded as a coating around the electrode after current contact has been made or the wire and flux may be fed separately into the arc zone. Welds may be made also by welding with a bare wire through a layer of the plastic flux. Because of its natural consistency, the plastic flux will adhere to both vertical and overhead surfaces. It is thus evident that use of the flux of this invention makes possible the attainment in one process of the favorable characteristics of the shielded arc and submerged melt processes.

What is claimed is:

1. A plastic welding flux consisting of 70 parts by weight of a mixture of dry fluxing agents having the following composition:

| | Parts by weight |
|---|---|
| Asbestos | 16 |
| Titanium dioxide | 12 |
| Ferromanganese | 8 |
| Sodium silicate | 34 | and 30 parts by weight of glycerol.

2. A plastic welding flux consisting of 70 parts by weight of a mixture of dry fluxing agents having the following composition:

| | Parts by weight |
|---|---|
| Asbestos | 16 |
| Titanium dioxide | 12 |
| Ferromanganese | 8 |
| Sodium silicate | 34 | said flux being rendered plastic by the incorporation therein of 30 parts of polyethylene glycol.

3. A plastic welding flux consisting of 70 parts by weight of a mixture of dry fluxing agents having the following composition:

| | Parts by weight |
|---|---|
| Asbestos | 16 |
| Titanium dioxide | 12 |
| Ferromanganese | 8 |
| Sodium silicate | 34 | said flux being plasticized by the presence therein of 5 parts of polyethylene glycol and 25 parts of glycerol.

4. A plastic welding flux consisting of 70 parts by weight of a mixture of dry fluxing agents containing:

| | Parts by weight |
|---|---|
| Calcium carbonate | 36 |
| Fluorspar | 34 |
| Sodium silicate | 9 |
| Aluminum oxide | 3 |
| Silicon dioxide | 7 |
| Ferromanganese | 1 |
| Ferrotitanium | 5 |
| Ferrosilicon | 5 | and 30 parts of glycerol.

5. A plastic welding flux consisting of 70 parts by weight of a mixture of dry fluxing agents containing:

| | Parts by weight |
|---|---|
| Calcium carbonate | 36 |
| Fluorspar | 34 |
| Sodium silicate | 9 |
| Aluminum oxide | 3 |
| Silicon dioxide | 7 |
| Ferromanganese | 1 |
| Ferrotitanium | 5 |
| Ferrosilicon | 5 | and 30 parts of polyethylene glycol.

6. A plastic welding flux consisting of 70 parts by weight of a mixture of dry fluxing agents containing:

| | Parts by weight |
|---|---|
| Calcium carbonate | 36 |
| Fluorspar | 34 |
| Sodium silicate | 9 |
| Aluminum oxide | 3 |
| Silicon dioxide | 7 |
| Ferromanganese | 1 |
| Ferrotitanium | 5 |
| Ferrosilicon | 5 | and 5 parts of polyethylene glycol and 25 parts of glycerol.

7. A plastic welding flux consisting of 70 parts by weight of a mixture of dry fluxing agents having the following composition:

| | Parts by weight |
|---|---|
| Magnesium silicate | 16 |
| Titanium dioxide | 12 |
| Ferromanganese | 8 |
| Sodium silicate | 34 |
| Glycerol | 30 |

8. An arc welding method comprising introducing welding current in a bare metal electrode and extruding around said electrode a plastic flux consisting of dry flux components and at least one organic constituent to render the same plastic and capable of providing at the arc zone where fusion and welding occur, a neutral agent for protecting by means of both solid and gaseous shielding media, molten metal from said electrode to produce weld joints, said organic constituent having a carbon to oxygen ratio between 0.5 to 1 and 2 to 1, a viscosity of not more than 5000 centipoises at 20° F., but of at least 10 centipoises at temperatures up to 120° F., a boiling point of not less than 450° F., said organic constituent being chemically inert to and able to wet said flux components.

References Cited in the file of this patent

UNITED STATES PATENTS

| 2,223,230 | Shepherd | Nov. 26, 1940 |
| 2,266,060 | Miller | Dec. 16, 1941 |
| 2,291,399 | Miller | July 28, 1942 |

FOREIGN PATENTS

| 483,566 | Great Britain | Apr. 19, 1938 |

OTHER REFERENCES

Welding Handbook, 3rd ed., pages 515–517, American Welding Society, 1951.